Patented Aug. 11, 1931

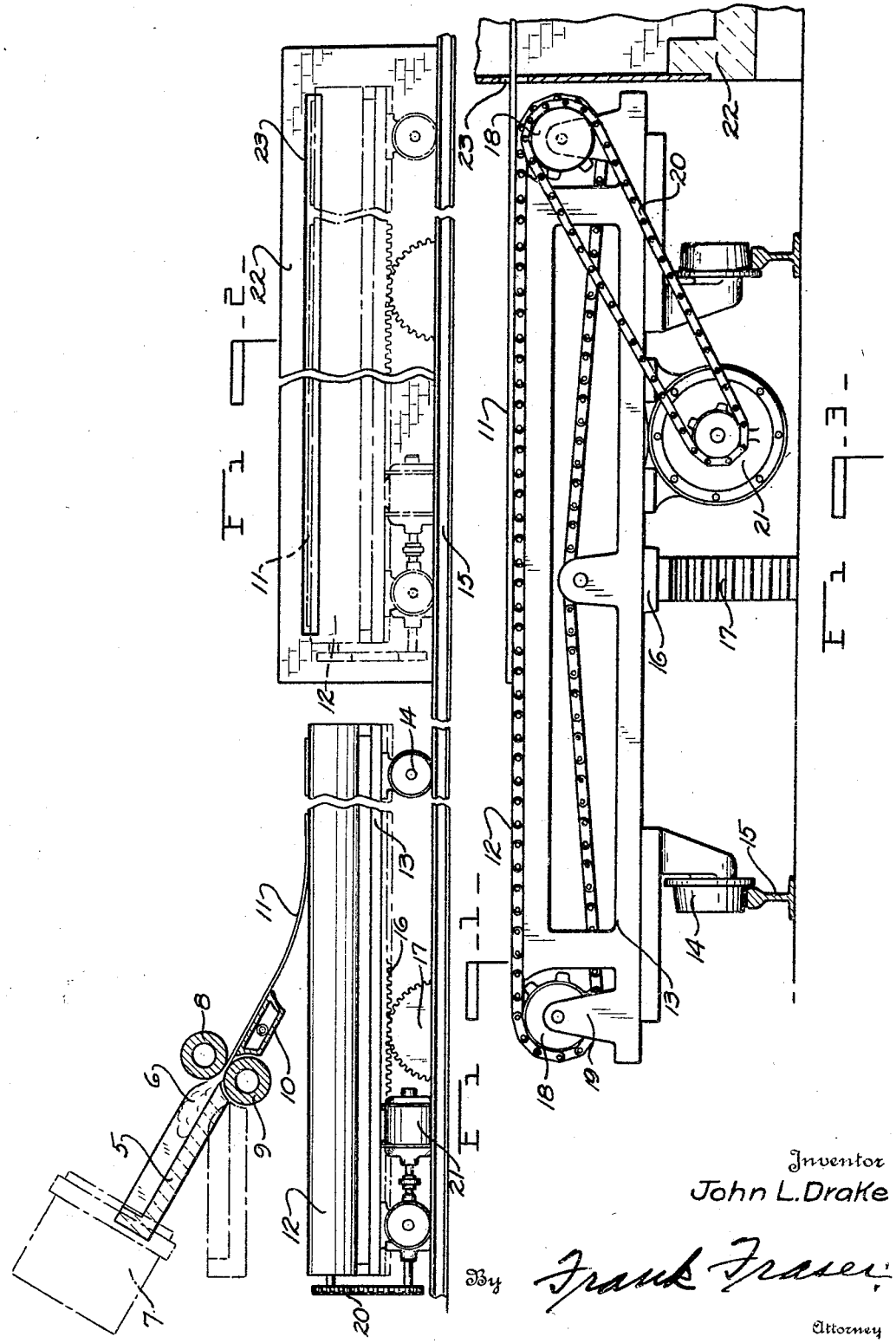

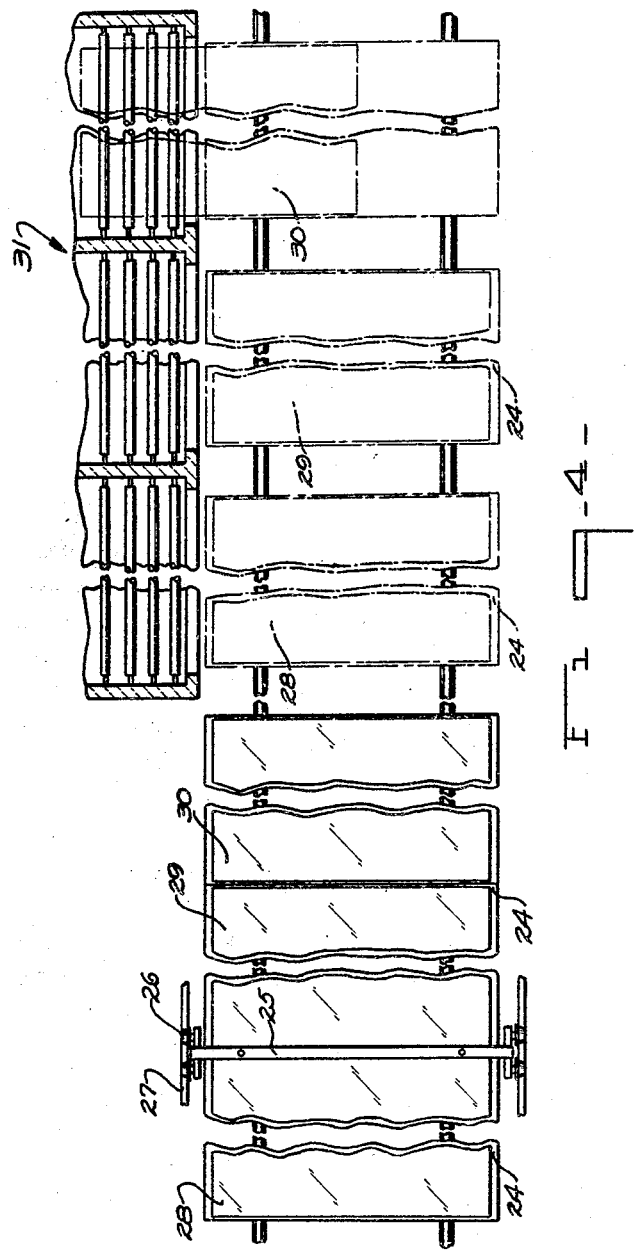

1,818,208

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

APPARATUS FOR FORMING AND ANNEALING SHEET GLASS

Application filed August 2, 1928. Serial No. 297,016.

The present invention relates to an improved process of and apparatus for forming and annealing sheet glass.

An important object of the invention is to provide such a process and apparatus for forming and annealing sheet glass, wherein the glass sheet is adapted to be produced at a relatively high rate of speed and subsequently annealed at a speed relatively less than the forming speed.

A further object of the invention is the provision of means, wherein a mass of molten glass is reduced to sheet form and deposited as it is formed upon a conveying means, said conveying means being operable to shift the sheet transversely of its line of formation so as to discharge the same therefrom.

A still further object of the invention is to provide means for rapidly reducing a mass of molten glass to sheet form and for depositing the sheet as it is formed upon a conveyor, said conveyor being normally inoperative during the laying of the sheet thereon but adapted to be subsequently driven in a manner to transfer the sheet transversely of its line of formation into an annealing leer, the speed of the conveyor being relatively less than the forming speed of the sheet.

Other objects and advantages of the invention will become more apparent during the course of the following description when taken in connection with the accompanying drawings.

In the drawings forming a part of this application and wherein like numerals are employed to designate like parts throughout the same, Fig. 1 is an elevation, partially in section, of apparatus provided by the present invention.

Fig. 2 illustrates diagrammatically the conveyor in sheet discharging position adjacent the intake end of an annealing leer.

Fig. 3 is an end view of the conveying means showing the manner of transferring the sheet therefrom into the leer, and Fig. 4 is a plan view showing apparatus for the formation of a plurality of sheets.

Referring to Fig. 1, the numeral 5 designates a support or receiver adapted to receive thereon a mass of molten glass 6 from a pot 7 or other suitable receptacle. Associated with one end of the support 5 is a pair of sheet forming rolls 8 and 9 arranged with respect to one another to create a sheet forming pass therebetween through which the molten glass 6 is adapted to be moved and reduced to a sheet of substantially predetermined and uniform thickness. An inclined slab 10 is mounted beneath the sheet forming pass in a manner to receive the sheet 11 issuing therefrom and for guiding said sheet upon an endless conveyor 12 arranged therebeneath.

As shown most clearly in Fig. 3, the endless conveyor or table 12 is mounted upon a truck 13 supported upon wheels 14 adapted to run on tracks 15. The truck 13 may be provided upon its lower surface with a longitudinally extending rack bar 16 meshing with and driven from a drive pinion 17 connected to a suitable source of power so that upon rotation of the said gear, the truck and conveyor may be moved as a unit along the tracks 15 in the desired direction. The conveyor 12 may comprise a plurality of pivotally associated links illustrated in Fig. 3 or it may be of a solid construction such as illustrated in Fig. 1. As shown in Fig. 3, the conveyor 12 is trained about drums or sprockets 18 journaled in the supports 19 carried by truck 13. One of the sprockets has connection with a sprocket chain 20 connected to a motor 21 which may be operated at variable speeds to rotate the conveyor 12 in the desired manner. It will be noted that the conveyor 12 is arranged transversely of the truck 13 so that the said conveyor will rotate in a direction at right angles to the direction of movement of the said truck along the tracks 15.

The length of the conveyor 12 is preferably such that it can support at one time the entire sheet 11 formed from the mass of molten glass 6. During the forming of the sheet 11, the truck and conveyor are moved to the right as a unit beneath the slab 10 so that the sheet will be laid, as it is formed, upon the latter. During the formation of the sheet and the laying thereof upon the conveyor, the said conveyor remains stationary except insofar as it is carried along by the truck. That is, during this period of operation, the conveyor is not rotated about the sprockets 18.

As above stated, during the depositing or laying of the sheet 11 upon the conveyor 12, the said conveyor is not movable about the sprockets 18. The sheet is adapted to be formed at a relatively high rate of speed and the truck and conveyor are movable as a unit under the sheet forming mechanism at substantially the same speed as the peripheral speed of said rolls so that as the sheet is laid upon the conveyor, it will not be buckled, distorted or otherwise disturbed. The track system 15 is arranged to convey the truck to a position adjacent the intake end of an annealing leer 22 provided with an opening 23 through which the glass sheet 11 may be inserted. When the truck assumes such a position, and which position is indicated by the broken lines in Fig. 2, the movement of the truck is stopped and the conveyor operated or driven in a manner to feed the sheet transversely therefrom into the leer. In other words, the sheet 11 is carried forward from its point of formation longitudinally and is then shifted transversely or laterally into the annealing leer. After the sheet has been transferred into the leer, the conveyor is stopped and the truck and conveyor returned to a position beneath the sheet forming mechanism.

While it is preferred to rapidly reduce the mass of molten glass to sheet form, it is desirable to move the sheet relatively slowly during the annealing thereof. The sheet may be supported upon the conveyor 12 sufficiently long to permit setting thereof to that point where the tendency for it to sag will be avoided. On the other hand, the leer may be provided with conveyors capable of supporting the sheet in a flat plane until the sheet has become sufficiently set to sustain its own weight without sagging between rolls. In any event, the sheet is adapted to be moved forwardly through the leer at a speed materially less than the forming speed thereof.

In Fig. 4 is illustrated a slightly modified construction wherein instead of using the single conveyor 12 above described, a plurality of trucks 24 are adapted to be coupled together to support thereon the sheet 11, each truck carrying an individual conveyor 12 and the sheet being formed and laid upon the several conveyors in the same manner as it is laid upon the single conveyor 12. However, instead of transferring the sheet in its entirety from the conveyors into an annealing leer, the said sheet is first cut into a plurality of smaller sections and to this end a cutting mechanism 25 may be provided.

The cutting mechanism 25 is arranged transversely of the sheet and is supported on wheels 26 movable along tracks 27. Due to the plasticity of the sheet, the cutting mechanism may be in the form of a knife or shears and to obtain a square cut, the said cutting mechanism is movable with the sheet during the slight period of time required for the making of said cut. While the sheet may be cut into as many smaller sections as desired, in the case herein illustrated, the single sheet 11 is cut twice to form three separate sections or sheets of glass 28, 29 and 30. The trucks and conveyors carried thereby are moved forward as a unit into a position adjacent the intake end of the annealing leer 31, which position is illustrated by the broken lines. As shown, the leer 31 is composed of three separate sections so that each sheet may be fed into one section of the leer from its respective conveyor. As soon as the sheets have been transferred from the conveyors into the leer, the conveyors are stopped and the trucks returned to a position beneath the sheet forming mechanism in preparation for the formation of additional sheets.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the production of sheet glass, means for forming the sheet, an annealing leer, means for receiving the sheet from the forming means and for conveying the same forwardly to a point adjacent the leer, and circulatory means operable to shift the sheet transversely with respect to the forward movement of said supporting means to effect transfer of the sheet thereform into said leer.

2. In apparatus for the production of sheet glass, means for forming the sheet, an annealing leer, conveying means for receiving the sheet thereupon from the forming means, said conveying means being movable forwardly as a unit during the laying of the sheet thereon and being adapted to convey the sheet to a point adjacent the annealing leer, and means for imparting a circulatory motion to a portion of said conveying means only to effect the transfer of the sheet transversely therefrom into said leer.

3. In apparatus for the production of sheet glass, an annealing leer, means remote from the leer for forming the sheet, conveying means for receiving the sheet thereupon as it is formed and conveying it to a point adjacent the leer, means for carrying said conveying means bodily forwardly during the laying of the sheet thereon, and means for moving said conveying means transversely with respect to the line of formation of the sheet to effect transfer of the sheet therefrom into said leer.

4. In apparatus for the production of sheet glass, an annealing leer, means remote from the leer for forming a sheet of glass, an endless conveyor for receiving the sheet as it is formed thereupon, means for moving the conveyor bodily forwardly during the laying of the sheet thereon and to a point adjacent the leer, and means for imparting a circulatory motion to said conveyor transversely with respect to the line of formation of the sheet to effect transfer of the sheet therefrom into said leer.

5. In apparatus for the production of sheet glass, an annealing leer, means for forming the sheet, a truck, a table associated with the truck and adapted to receive the sheet thereupon from the forming means, said truck and table being movable forwardly as a unit during the laying of the sheet thereon and to carry the sheet to a point adjacent the leer, and means for moving said table transversely with respect to said truck to effect transfer of the sheet therefrom into said leer.

6. In apparatus for the production of sheet glass, means for forming the sheet, an annealing leer, a truck, an endless conveyor associated therewith and adapted to receive the sheet thereupon from the forming means, said truck and conveyor being movable forwardly as a unit during the laying of the sheet thereon and adapted to convey the sheet to a position adjacent the annealing leer, and means for imparting a circulatory motion to said conveyor transversely with respect to the forward movement of said truck to effect transfer of the sheet therefrom into said leer.

7. In apparatus for the production of sheet glass, means for forming the sheet, an annealing leer, an endless conveyor for receiving the sheet thereupon from the forming means and arranged at right angles to the line of formation thereof, means for moving the conveyor forwardly during the laying of the sheet thereon to carry the sheet to a point adjacent the leer, and means for then driving said conveyor in a direction at right angles to its first direction of movement to effect delivery of the sheet therefrom into said leer.

8. In apparatus for the production of sheet glass, means for forming the sheet, an annealing leer, a truck, an endless conveyor carried by the truck and arranged transversely thereof, means for moving the truck and conveyor forwardly as a unit during the laying of the sheet thereupon for carrying the sheet to a position adjacent the annealing leer, and separate means for driving the conveyor in a direction at right angles to its first direction of movement to deliver the sheet therefrom into the annealing leer.

Signed at Toledo, in the county of Lucas and State of Ohio, this 25th day of June, 1928.

JOHN L. DRAKE.